US012027772B2

(12) United States Patent
Guo

(10) Patent No.: US 12,027,772 B2
(45) Date of Patent: Jul. 2, 2024

(54) MULTI-BAND ANTENNA AND METHOD FOR TUNING MULTI-BAND ANTENNA

(71) Applicant: CommScope Technologies LLC, Hickory, NC (US)

(72) Inventor: Pengfei Guo, Suzhou (CN)

(73) Assignee: CommScope Technologies LLC, Claremont, NC (US)

( * ) Notice: Subject to any disclaimer, the term of this patent is extended or adjusted under 35 U.S.C. 154(b) by 283 days.

(21) Appl. No.: 17/668,437

(22) Filed: Feb. 10, 2022

(65) Prior Publication Data

US 2022/0278462 A1 Sep. 1, 2022

(30) Foreign Application Priority Data

Feb. 26, 2021 (CN) ......................... 202110216447.2

(51) Int. Cl.

| | |
|---|---|
| ***H01Q 21/06*** | (2006.01) |
| ***H01Q 9/28*** | (2006.01) |
| ***H01Q 21/26*** | (2006.01) |

(52) U.S. Cl.

CPC ............. *H01Q 21/062* (2013.01); *H01Q 9/28* (2013.01); *H01Q 9/285* (2013.01); *H01Q 21/06* (2013.01); *H01Q 21/26* (2013.01)

(58) Field of Classification Search

CPC ...... H01Q 21/062; H01Q 9/285; H01Q 21/26; H01Q 21/06; H01Q 9/28

USPC .......................................................... 343/702

See application file for complete search history.

(56) References Cited

U.S. PATENT DOCUMENTS

| | | | | |
|---|---|---|---|---|
| 2004/0263420 | A1* | 12/2004 | Werner | H01Q 1/38 343/909 |
| 2012/0098628 | A1* | 4/2012 | Batchelor | H01Q 15/0066 333/24 C |
| 2021/0391647 | A1* | 12/2021 | Guo | H01Q 19/106 |

FOREIGN PATENT DOCUMENTS

| | | | |
|---|---|---|---|
| CN | 112134017 | A | 12/2020 |
| CN | 212182533 | U | 12/2020 |
| WO | 2019009951 | A1 | 1/2019 |
| WO | 2020200476 | A1 | 10/2020 |
| WO | 2020239190 | A1 | 12/2020 |

OTHER PUBLICATIONS

"European Search Report in Corresponding European Patent Application No. 22158144.0; Mailing Date Aug. 4, 2022; 11 Pages".

* cited by examiner

*Primary Examiner* — Hai V Tran

(74) *Attorney, Agent, or Firm* — Myers Bigel, P.A.

(57) ABSTRACT

A multi-band antenna includes a first radiating element that is configured to operate in a first frequency band, a second radiating element that is configured to operate in a second, different frequency band, and a metamaterial adjusting element that is configured to at least partially reflect the electromagnetic radiation in the second frequency band incident on the metamaterial adjusting element such that the reflected electromagnetic radiation is redirected to at least partially cancel the interference of the first radiating element to the second radiating element.

19 Claims, 10 Drawing Sheets

MULTI-BAND ANTENNA AND METHOD FOR TUNING MULTI-BAND ANTENNA

CROSS-REFERENCE TO RELATED APPLICATION

The present application claims priority to Chinese Patent Application No. 202110216447.2 filed Feb. 26, 2021, the entire content of which is incorporated herein by reference as if set forth fully herein.

FIELD

The present disclosure relates to communication systems, and more specifically, to multi-band antennas and to methods for tuning multi-band antennas that are suitable for communication systems.

BACKGROUND

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station.

In many cases, each base station is divided into "sectors". In perhaps the most common configuration, a hexagonally shaped cell is divided into three 120° sectors, and each sector is served by one or more base station antennas that generate radiation patterns or "antenna beams" having an azimuth Half Power Beam Width (HPBW) of approximately 65°. Typically, the base station antennas are mounted on a tower structure, with the antenna beams that are generated by the base station antennas directed outwardly. Base station antennas are often realized as linear or planar phased arrays of radiating elements.

In order to accommodate the ever-increasing volumes of cellular communications, cellular operators have added cellular services in a variety of new frequency bands. While in some cases it is possible to use linear arrays of so-called "wideband" or "ultra-wideband" radiating elements to provide service in multiple frequency bands, in other cases it is necessary to use different linear arrays or planar arrays of radiating elements to support service in the different frequency bands.

As the number of frequency bands has proliferated, increased sectorization has become more common (e.g., dividing a cell into six, nine or even twelve sectors), and the number of base station antennas deployed at a typical base station has increased significantly. However, due to local zoning ordinances and/or weight and wind loading constraints for the antenna towers, etc. there is often a limit as to the number of base station antennas that can be deployed at a given base station. In order to increase capacity without further increasing the number of base station antennas, so-called multi-band antennas have been introduced in which multiple linear arrays of radiating elements are included in a single antenna. One very common multi-band antenna includes one linear array of "low-band" radiating elements that are used to provide service in some or all of the 617 to 960 MHz frequency band, and two linear arrays of "mid-band" radiating elements that are used to provide service in some or all of the 1427 to 2690 MHz frequency band. These linear arrays of low-band and mid-band radiating elements are typically mounted in a side-by-side fashion.

There is also great interest in multi-band antennas that may include two linear arrays of low-band radiating elements and two (or four) linear arrays of mid-band radiating elements. These antennas may be used in various applications, including 4×4 multiple-input and multiple-output ("MIMO") applications, or may be used as multi-band antennas with two different low-bands (for example, 700 MHz low-band linear array and 800 MHz low-band linear array) and two different mid-bands (for example, 1800 MHz mid-band linear array and 2100 MHz mid-band linear array).

In order to realize such multi-band antennas in a commercially acceptable manner, the lateral spacing between the linear arrays may be reduced in order to keep the width of the base station antenna within acceptable dimensions. Unfortunately, as the linear arrays of radiating elements are aligned closer together, the degree of signal coupling between the linear arrays may increase. For example, the coupling interference between the low-band radiating elements or between the mid-band radiating elements may increase; the low-band radiating element may produce large scattering effects on the mid-band radiating elements in the rear area. These "parasitic" couplings may cause distortion of the radiation pattern, for example, an undesired increase in HPBW.

SUMMARY

According to a first aspect of the present disclosure, a multi-band antenna is provided, comprising: a first radiating element, configured to operate within a first frequency band and to emit first electromagnetic radiation within the first frequency band; a second radiating element, configured to operate within a second frequency band different from the first frequency band and to emit second electromagnetic radiation within the second frequency band; and a metamaterial adjusting element, configured to at least partially reflect the second electromagnetic radiation incident on the metamaterial adjusting element such that the reflected second electromagnetic radiation is redirected to at least partially cancel the interference of the first radiating element to the second radiating element.

According to a second aspect of the present disclosure, a multi-band antenna is provided, comprising: a first radiating element array, including a plurality of first radiating elements, the first radiating element array being configured to operate within a first frequency band and to generate a first antenna beam within the first frequency band; a second radiating element array, including a plurality of second radiating elements, the second radiating element array being configured to operate within a second frequency band and to generate a second antenna beam within the second frequency band; and a metamaterial adjusting element array, including a plurality of metamaterial adjusting elements for the plurality of second radiating elements, wherein the plurality of metamaterial adjusting elements are arranged around the second radiating element array and at least partially behind the first radiating element array, and each metamaterial adjusting element is configured to have frequency selective characteristics, so that the metamaterial adjusting element array is configured to adjust the radiation pattern of the second antenna beam.

According to a third aspect of the present disclosure, a multi-band antenna is provided, comprising: a first radiating element array, including a plurality of first radiating elements, the first radiating element array being configured to operate within a first frequency band and to generate a first antenna beam within the first frequency band; a second radiating element array, including a plurality of second radiating elements, the second radiating element array being configured to operate within a second frequency band and to generate a second antenna beam within the second frequency band; wherein each first radiating element includes a radiator including a first dipole arm and a second dipole arm, the first dipole arm and the second dipole arm each include a narrowed arm segment and a widened arm segment, and the narrowed arm segment and the widened arm segment form at least one resonant structure, the multi-band antenna further including: a metamaterial adjusting element array, including a plurality of metamaterial adjusting elements respectively for the plurality of second radiating elements, wherein the plurality of metamaterial adjusting elements and the resonant structure cooperate with each other to suppress the interference of the first radiating element on the second radiating element.

According to a fourth aspect of the present disclosure, a method for tuning a multi-band antenna is provided, the multi-band antenna including a reflector and a first radiating element array and a second radiating element array mounted on the reflector, the first radiating element array including a plurality of first radiating elements, the first radiating element array being configured to operate within a first frequency band and to generate a first antenna beam within the first frequency band; the second radiating element array including a plurality of second radiating elements, the second radiating element array being configured to operate within a second frequency band and to generate a second antenna beam within the second frequency band, wherein the method includes (1) arranging a metamaterial adjusting element around the second radiating element array and at least partially behind the first radiating element array and (2) adjusting the orientation and/or distance of the metamaterial adjusting element relative to the reflector, and/or adjusting the distance of the metamaterial adjusting element to the second radiating element array, so as to tune the pattern of the second antenna beam.

According to a fifth aspect of the present disclosure, a method for tuning a multi-band antenna is provided, the multi-band antenna including a reflector and a first radiating element array and a second radiating element array mounted on the reflector, the first radiating element array including a plurality of first radiating elements, the first radiating element array being configured to operate within a first frequency band and to generate a first antenna beam within the first frequency band; the second radiating element array including a plurality of second radiating elements, the second radiating element array being configured to operate within a second frequency band and to generate a second antenna beam within the second frequency band, wherein each first radiating element includes a radiator including a first dipole arm and a second dipole arm, the first dipole arm and the second dipole arm each include a narrowed arm segment and a widened arm segment, the narrowed arm segment and the widened arm segment form at least one resonant structure, and the resonant structure attenuates currents within a first portion of frequency range of the second frequency band, wherein the method includes (1) analyzing the radiation pattern of the second antenna beam at a plurality of frequency points within the second frequency band and (2) designing a metamaterial adjusting element for at least one frequency point such that the metamaterial adjusting element shows reflection characteristics at the at least one frequency point.

According to a sixth aspect of the present disclosure, a multi-band antenna is provided, comprising a reflector, a first radiating element that is configured to operate within a first frequency band, a second radiating element that is configured to operate within a second frequency band different from the first frequency band, and a metamaterial adjusting element mounted to extend forwardly from the reflector, the metamaterial adjusting element configured to substantially reflect electromagnetic radiation incident on the metamaterial adjusting element that is within a first portion of the second frequency band.

Figure 1:
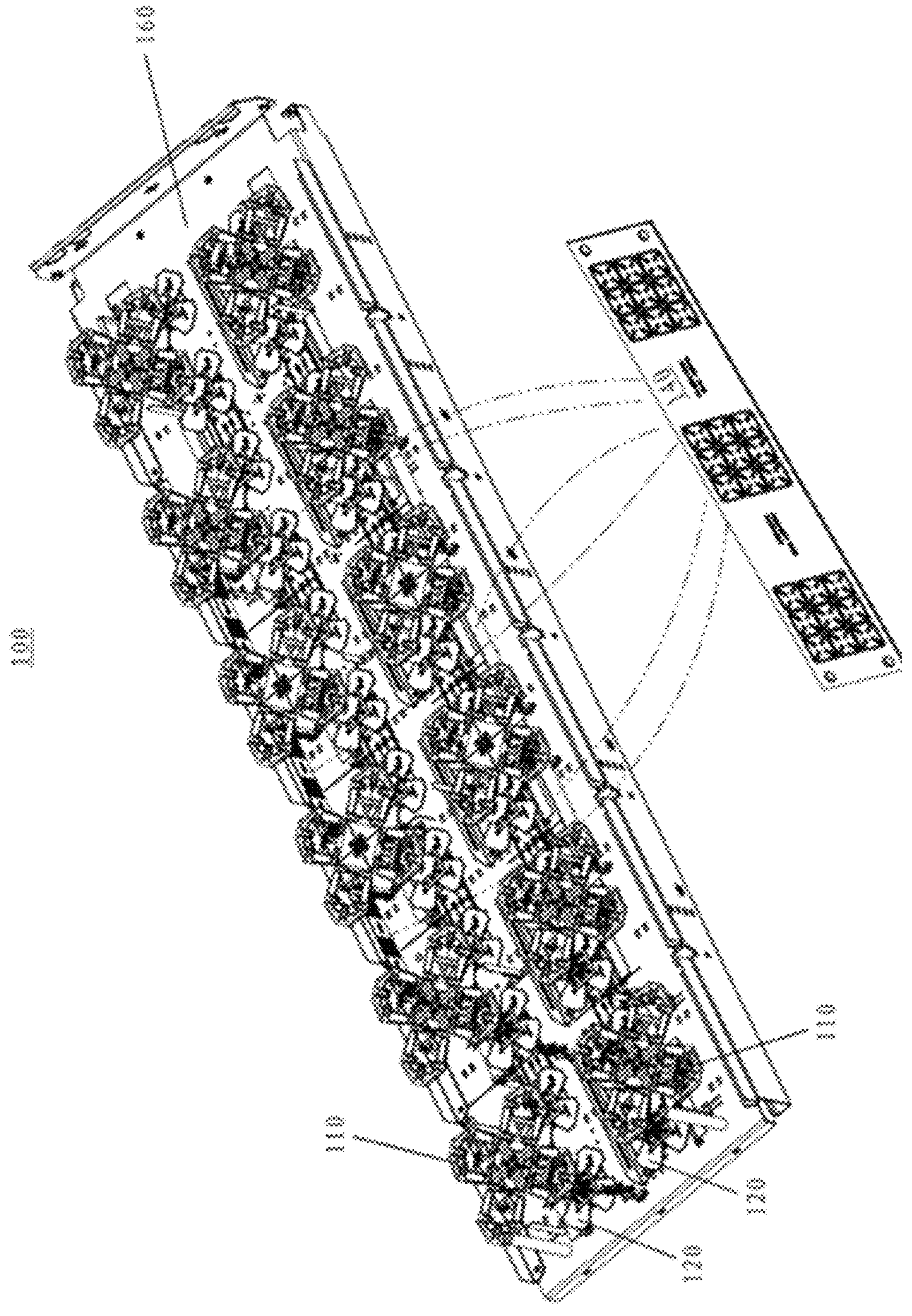
FIG. 1 is a schematic perspective view of a multi-band antenna according to some examples of the present disclosure.

Note, in the embodiments described below, the same signs are sometimes used in common between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the position, size, range, etc. disclosed in the attached drawings.

DETAILED DESCRIPTION

The present disclosure will be described below with reference to the attached drawings, which show several examples of the present disclosure. However, it should be understood that the present disclosure can be presented in many different ways and is not limited to the examples described below. In fact, the examples described below are intended to make the present disclosure more complete and to fully explain the protection scope of the present disclosure to those skilled in the art. It should also be understood that the examples disclosed in the present disclosure may be combined in various ways so as to provide more additional examples.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this Specification, elements, nodes or features that are "connected" together may be mentioned. Unless explicitly stated otherwise, "connected" means that one element/node/feature can be mechanically, electrically, logically or otherwise connected with another element/node/feature in a direct or indirect manner to allow interaction, even though the two features may not be directly connected. That is, "connected" means direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features. The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied. Any realization method described exemplarily herein may not be necessarily interpreted as being preferable or advantageous over other realization methods. Furthermore, the present disclosure is not limited by any expressed or implied theory given in the above technical field, background art, summary of the invention or specific embodiments.

As used herein, the word "basically" means including any minor changes caused by design or manufacturing defects, device or component tolerances, environmental influences, and/or other factors. The word "basically" also allows the gap from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

As discussed above, in multi-band antennas, it may be important to reduce the scattering effect that the low-band radiating elements may have on the mid-band radiating elements, so as to avoid undesired distortion of the radiation pattern. An aspect of the present disclosure provides a multi-band antenna, which includes: a first radiating element, for example, a low-band radiating element, configured to be capable of operating within a first frequency band and emitting first electromagnetic radiation within the first frequency band; a second radiating element, for example, a mid-band radiating element, configured to be capable of operating within a second frequency band different from the first frequency band and emitting second electromagnetic radiation within the second frequency band; and a metamaterial adjusting element, configured to at least partially reflect the second electromagnetic radiation incident on the metamaterial adjusting element such that the reflected second electromagnetic radiation is redirected so as to at least partially cancel or offset the interference, for example, scattering effect, of the first radiating element to the second radiating element. Therefore, the multi-band antenna, according to the present disclosure, can improve the shape of the radiation pattern generated by the second radiating element.

The multi-band antenna, according to some examples of the present disclosure, will now be described in more detail with reference to the drawings. It should be noted that the multi-band antenna may also have other components, and in order to avoid obscuring the main points of the present disclosure, the other components are not shown in the attached drawings and will not be discussed herein. It should also be noted that the drawings only schematically show the relative positional relationship of various components, and there is no particular limitation on the specific structure of each component.

Figures 2A, 2B, 2C:
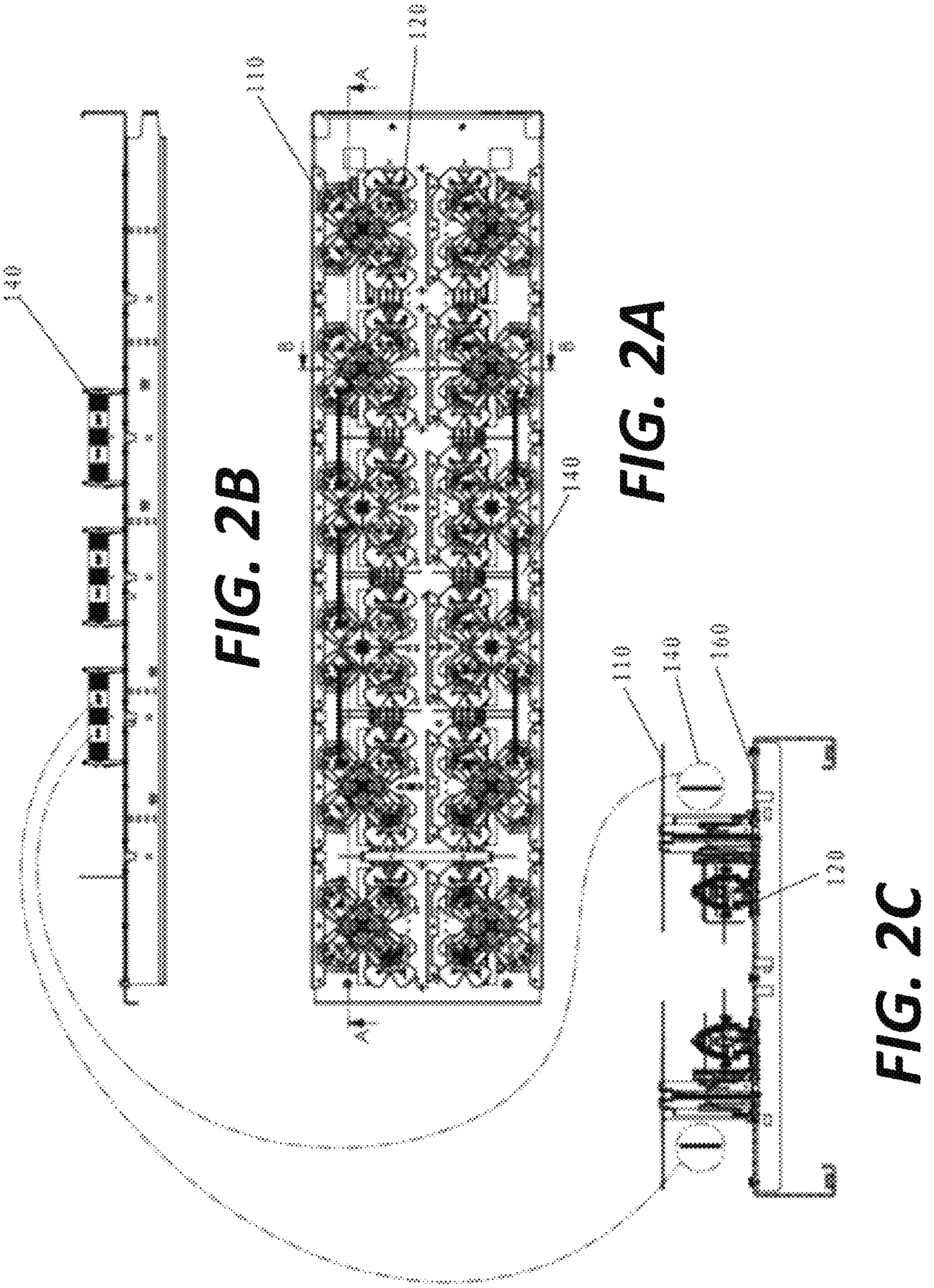
FIG. 2*a* is a schematic front view of the multi-band antenna in FIG. 1.
FIG. 2*b* is a schematic side view of the multi-band antenna taken along the line A-A of FIG. 2*a*.
FIG. 2*c* is a schematic end view of the multi-band antenna taken along the line B-B of FIG. 2*a*.

Referring to FIGS. 1, 2*a*, 2*b*, and 2*c*, FIG. 1 is a schematic perspective view of a multi-band antenna 100 according to some examples of the present disclosure; FIG. 2*a* is a schematic front view of the multi-band antenna 100 in FIG.

1; FIG. 2*b* is a schematic side view of the multi-band antenna 100 taken along the line A-A of FIG. 2*a*; FIG. 2*c* is a schematic end view of the multi-band antenna 100 taken along the line B-B of FIG. 2*a*.

Referring to FIG. 1, the multi-band antenna 100 may be mounted for operation on a raised structure, such as an antenna tower, a telegraph pole, a building, a water tower, etc., such that a longitudinal axis of the antenna 100 extends roughly perpendicular to the ground. The antenna 100 usually includes a radome (not shown) that provides environmental protection. The multi-band antenna 100 includes a reflector 160, which may comprise a metal surface that provides a ground plane and reflects electromagnetic radiation reaching the metal surface such that the electromagnetic radiation is redirected to propagate, for example, forwardly. The antenna 100 may further include additional mechanical and electronic components, such as one or more of connectors, cables, phase shifters, remote electronic tilt (RET) units, duplexers, and the like, arranged on a rear side of the reflector 160.

The multi-band antenna 100 may further include first radiating elements 110 and second radiating elements 120 that are arranged on a front side of the reflector 160. In the illustrated examples, the first radiating elements 110 are arranged as two vertically extending linear arrays adjacent to each other in a horizontal direction. The second radiating elements 120 are likewise arranged as two vertically extending linear arrays adjacent to each other in the horizontal direction. The two linear arrays of second radiating elements 120 may be arranged between the two linear arrays of first radiating elements 110 to reduce the width of the antenna.

An operating frequency band of the first radiating elements 110 may be, for example, 617 to 960 MHz or a sub-band thereof. An operating frequency band of the second radiating elements 120 may be, for example, 1427 to 2690 MHz or a sub-band thereof. In other words, the first radiating elements 110 may be configured as low-band radiating elements that can operate within a first frequency band, for example 617 to 960 MHz or a sub-band thereof, and emit first electromagnetic radiation within the first frequency band. The second radiating elements 120 may be configured as mid-band radiating elements that can operate within a second frequency band, for example 1427 to 2690 MHz or a sub-band thereof, and emit second electromagnetic radiation within the second frequency band. Depending on how the first radiating elements 110 are fed, the two linear arrays may be configured to form two separate first antenna beams (per polarization) within the first frequency band, or may be configured to form a single antenna beam (per polarization) within the first frequency band. Depending on how the second radiating elements 120 are fed, the two linear arrays may be configured to form two separate second antenna beams (per polarization) within the second frequency band, or may be configured to form a single first antenna beam (per polarization) within the second frequency band.

The multi-band antenna 100 may further include a metamaterial adjusting element 140 arranged on the front side of the reflector 160 to cooperate with the second radiating element 120, thereby at least partially cancelling a negative effect, for example, distortion of the radiation pattern of the second antenna beam, caused by the interference, such as scattering effect, of the first radiating element 110 to the second radiating element 120.

In the present disclosure, the metamaterial adjusting element 140 should be understood as a structure constituted by metamaterials or including metamaterials for adjusting the radio frequency performance of the antenna. Metamaterials are man-made materials with special properties that allow electromagnetic waves to change the general properties of the metamaterials. The properties of metamaterials stem from their precise geometric structure and size. In the present disclosure, metamaterials should be understood broadly, that is, metamaterials can include all periodic electromagnetic materials, such as frequency selective surfaces, electromagnetic band gap structures, metasurfaces, artificial magnetic conductors, photonic band gap structures, surface plasmons, and the like.

In some examples, the metamaterial adjusting element 140 may be configured as a frequency selective surface. The frequency selective surface can filter electromagnetic waves in space. By periodically arranging a plurality of frequency selective surface units 1401, such as passive resonance units, on a two-dimensional plane, a metamaterial with a specific reflection/transmission phase distribution can be formed. When electromagnetic waves are incident on the frequency selective surface, the frequency selective surface can selectively pass or block electromagnetic waves of different frequencies.

Figure 3A:
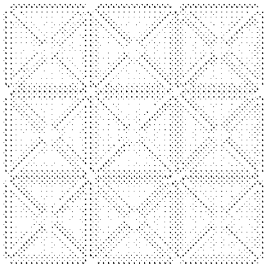
FIG. 3*a* is a schematic view of a frequency selective surface unit in a multi-band antenna according to some examples of the present disclosure.
Figure 3B:
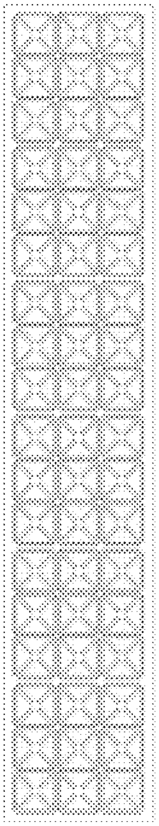
FIG. 3*b* is a schematic view of one-dimensional period of the frequency selective surface unit in FIG. 3*a*.
Figure 3C:
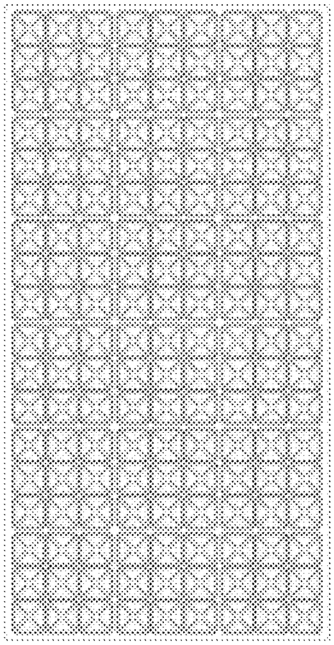
FIG. 3*c* is a schematic view of two-dimensional period of the frequency selective surface unit in FIG. 3*a*.
Figure 3D:
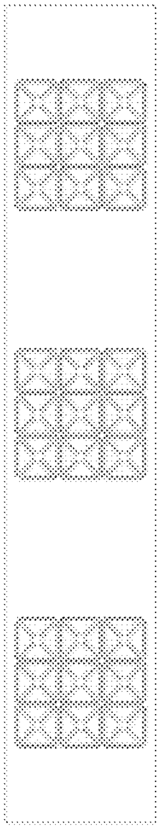
FIG. 3*d* is a schematic view of a variation of one-dimensional period of the frequency selective surface unit in FIG. 3*a*.

As in the illustrated example, the frequency selective surface may be configured as a printed circuit board element, and the periodically arranged frequency selective surface units 1401 may be printed on the printed circuit board element. FIG. 3*a* shows an exemplary frequency selective surface unit 1401. In some examples, a column of frequency selective surface units 1401 may be printed on the printed circuit board element to form a one-dimensional period of the frequency selective surface units 1401, as shown in FIG. 3*b*. In some examples, a plurality of rows and a plurality of columns of frequency selective surface units 1401 may be printed on the printed circuit board element to form a two-dimensional period of the frequency selective surface units 1401, as shown in FIG. 3*c*. In some examples, as shown in FIG. 3*d*, the spacing between the frequency selective surface units 1401 may also be adjusted according to actual application scenarios.

It should be understood that there may be various design forms of the frequency selective surface and it is not limited to the specific examples listed here. The resonant frequency point and/or operating bandwidth of the frequency selective surface may be adjusted by designing various sizes of the frequency selective surface unit 1401 to meet the requirements of different resonance points, multi-frequency resonance, and/or broadband resonance in different application scenarios. In the current example, the frequency selective surface is designed as a cost-effective single-layer PCB element. In other examples, the frequency selective surface may be designed as a multi-layer PCB element to realize wideband and ultra-wideband operating bandwidth. In addition, the frequency selective surface may also be constituted by periodically arranged metal patch units, which may be less expensive to fabricate than printed circuit board based frequency selective surfaces.

Continuing to refer to the illustrated examples, the multi-band antenna 100 may include a plurality of metamaterial adjusting elements 140 for a plurality of second radiating elements 120, and these metamaterial adjusting elements 140 may be arranged as a metamaterial adjusting element 140 array around the linear arrays of second radiating elements 120 and behind the first radiating elements. The metamaterial adjusting elements 140 may, for example, be designed to reflect the second electromagnetic radiation incident thereon while passing the first electromagnetic radiation incident thereon. Through this arrangement, the metamaterial adjusting elements 140 can at least partially reflect the second electromagnetic radiation incident on the metamaterial adjusting elements 140 such that the reflected second electromagnetic radiation is redirected without substantially impacting the radiation patterns of the linear arrays of first radiating elements 110. The metamaterial adjusting elements 140 can at least partially cancel the scattering effect of the first radiating elements 110 on the second radiating elements 120 by multi-path transmission of the electromagnetic radiation.

Figure 4A:
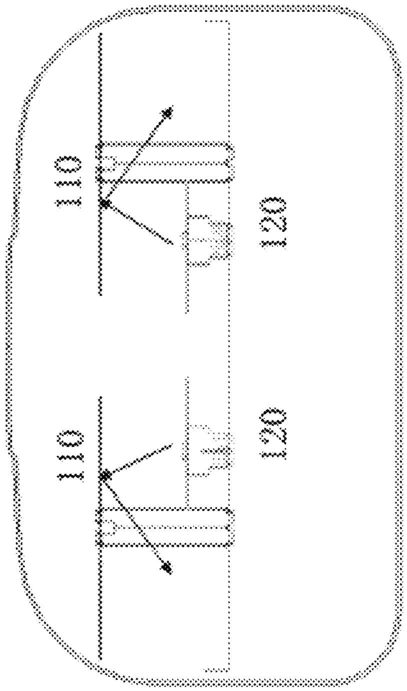
FIG. 4*a* is a schematic diagram of the scattering effect of a first radiating element on a second radiating element.
Figure 4B:
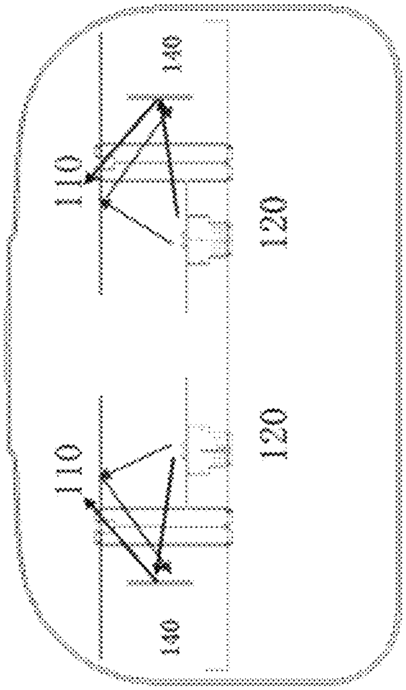
FIG. 4*b* is a schematic diagram illustrating using a metamaterial adjusting element to at least partially cancel the scattering effect described in FIG. 4*a*.

Referring to FIGS. 4*a* and 4*b*, FIG. 4*a* schematically shows a schematic diagram of the scattering effect of the first radiating element 110 on the second radiating element 120, and FIG. 4*b* schematically shows a schematic diagram of at least partially cancelling the scattering effect by the metamaterial adjusting element 140.

As shown in FIG. 4*a*, the first radiating element 110 is in front of the second radiating element 120 and at least partially covers the second radiating element 120, and thus the electromagnetic radiation emitted forward by the second radiating element 120 is at least incident on a radiator of the first radiating element 110. A dipole arm of the radiator of the first radiating element 110 can be regarded as an LC resonance structure with a resonant frequency within the aforementioned first frequency band, and the LC resonance structure will inevitably introduce a secondary resonance, which may fall into the aforementioned second frequency band, for example, near 1950 MHz. Therefore, during operation of the second radiating elements 120, a current within the second frequency band will be induced on the dipole arm of the first radiating element 110, thereby causing a scattering effect on the radiation emitted by the second radiating element 120. In the illustrated example, the second electromagnetic radiation emitted by one second radiating element 120 is incident on a radiator of one first radiating element 110 and is radiated backward by the radiator of the first radiating element 110 due to the scattering effect, thus changing the original radiation direction of a portion of the second electromagnetic radiation. As a result, the radiation pattern of the second antenna beam of the second radiating element 120 array may be distorted.

As shown in FIG. 4*b*, the metamaterial adjusting elements 140 may be arranged on an outer peripheral side of the first radiating element 110 array and the second radiating element 120 array. In other words, the first metamaterial adjusting element 140 is arranged on the left side of the linear arrays of first radiating elements 110 and the linear arrays of second radiating elements 120, and the second metamaterial adjusting element 140 is arranged on the right side of the linear arrays of first radiating elements 110 and the linear arrays of second radiating elements 120. With this arrangement of the metamaterial adjusting elements 140, the second electromagnetic radiation emitted by the second radiating element 120 that is scattered from the forward direction by the first radiating elements may be incident on the metamaterial adjusting elements 140 and be radiated forward by the metamaterial adjusting elements 140 (see the transmission paths indicated by the solid line). Therefore, the metamaterial adjusting element 140 realizes a multipath transmission of a portion of the second electromagnetic radiation to at least partially cancel the interference caused by the scattering effect.

In some examples, although the metamaterial adjusting element 140 is arranged behind the first radiating element 110, it should also be considered that sidelobes and/or backlobes of the first antenna beam may be incident on the metamaterial adjusting element 140. In order to prevent the metamaterial adjusting element 140 from producing undesired interference to the first antenna beam of the first radiating element 110 array, the metamaterial adjusting element 140 may be configured as a spatial band-stop filter so that the first electromagnetic radiation within the first frequency band or a sub-band thereof can be transmitted through the metamaterial adjusting element 140, and the electromagnetic radiation within the second frequency band or a sub-band thereof is basically blocked, for example, reflected, by the metamaterial adjusting element 140. Therefore, the metamaterial adjusting element 140 can at least partially avoid the distortion of the radiation pattern of the second antenna beam caused by the scattering effect while reducing the negative effect on the radiation pattern of the first antenna beam.

In an actual tuning process, many influencing factors need to be considered, such as: the number of the metamaterial adjusting elements 140, the orientation and/or distance of the metamaterial adjusting element 140 relative to the reflector (that is, an angle of an acting surface of the metamaterial adjusting element 140 toward the second radiating element 120 and/or a forward extending dimension of the acting surface of the metamaterial adjusting element 140), and the distance of the metamaterial adjusting element 140 to the second radiating element 120. Therefore, one or more of the aforementioned influencing factors may be adjusted appropriately according to the actual tuning situation to tune the pattern of the second antenna beam, so that the pattern of the second antenna beam meets desired requirements such as −3 dB lobe width, −10 dB lobe width, and/or pattern shape, etc.

Figure 5B:
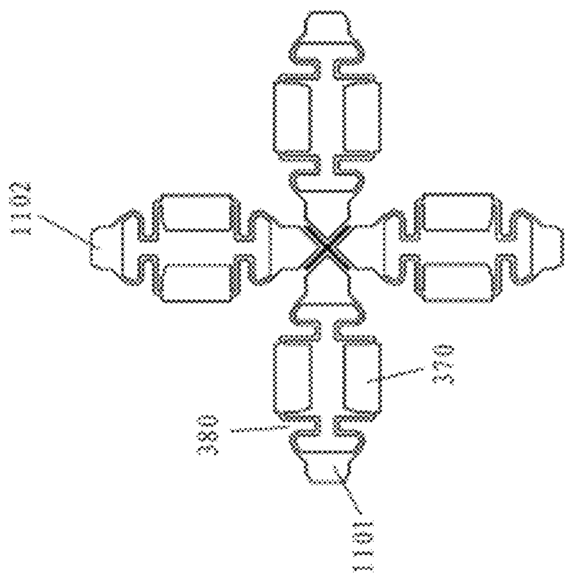
FIG. 5*b* is a second embodiment of the radiator of the first radiating element in the multi-band antenna according to some examples of the present disclosure.
Figure 5A:
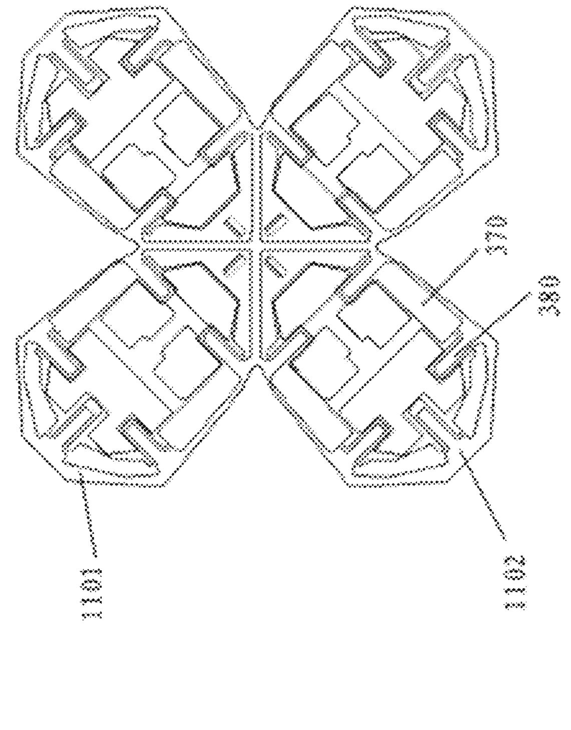
FIG. 5*a* is a first embodiment of a radiator of a first radiating element in a multi-band antenna according to some examples of the present disclosure.

Next, referring to FIGS. 5*a* and 5*b*, embodiments of the radiator of the first radiating element 110 in the multi-band antenna 100 according to some examples of the present disclosure will be further introduced.

In order to reduce the scattering effect of the first radiating element 110 on the second radiating element 120, the radiator of the first radiating element 110 may be designed as a cloaked radiator. The first radiating element 110 includes a radiator with a dipole arm that includes a narrowed arm segment 370 and a widened arm segment 380. The narrowed arm segment 370 and the widened arm segment 380 can form at least one resonance structure that is configured to at least partially attenuate currents within at least part of the frequency range of the second frequency band that could otherwise be induced on the dipole arm itself.

FIG. 5*a* and FIG. 5*b* show two typical embodiments of the radiator of the first radiating element 110. In FIG. 5*a*, a first radiator 1101 of the first radiating element 110 extends obliquely at +45°, and a second radiator 1102 of the first radiating element 110 extends obliquely at −45°. In FIG. 5*b*, the first radiator 1101 of the first radiating element 110 may extend horizontally (that is, at 0°), and the second radiator 1102 of the first radiating element 110 may extend vertically (that is, at 90°). Each dipole arm of each radiator may include at least one narrowed arm segment 370 and at least one widened arm segment 380. Each arm may include two conductive paths, wherein a first conductive path forms half of the generally elongated dipole arm and a second conductive path forms the other half of the dipole arm. Each conductive path may include a metal pattern that has a widened arm segment 380 and a narrowed arm segment 370. The narrowed arm segment 370 may be configured as a meandered arm segment to increase the path length thereof, thereby facilitating the compactness of the first radiating element 110 and/or a desired filtering effect. The narrowed arm segment 370 may be realized as a non-linear conductive segment, and may act as a high impedance segment that interrupts currents in the second frequency band, that is, the mid-band, that could otherwise be induced on the dipole arm itself. As such, the narrowed arm segment 370 can reduce induced mid-band currents on the first radiating element 110, thereby further reducing the scattering effect of the first radiating element 110 on the second radiating element 120. The narrowed arm segment 370 may make the first radiating element 110 almost invisible to the second radiating element 120, and thus endows the first radiating element 110 with a cloaking function. It is advantageous for the first radiating element 110 to have a cloaking function because the less mid-band current induced on the dipole arm of the first radiating element 110, the smaller impact on the radiation pattern of the second radiating element 120 array.

Although the aforementioned first radiating element 110 having a cloaking function can reduce the scattering effect, in some cases, the radiating element 110 may not be able to realize good cloaking function for the entire operating frequency band of the second radiating element 120. For example, it may be possible that the first radiating element 110 may produce undesired interference at one or more frequency point or sub-bands within the operating frequency band of the second radiating element 120.

In an actual tuning process, in order to design a suitable metamaterial adjusting element 140, the following steps of a method may be carried out. First, testing and analyzing the radiation pattern of the second antenna beam of the second radiating element 120 array at a plurality of frequency points within the second frequency band is performed. Then, it is determined whether the performance of the radiation pattern of the second antenna beam at the at least one frequency point needs to be improved according to design requirements; in other words, the first radiating element 110 may have a non-negligible scattering effect on the second radiating element 120 at the at least one frequency point, and the design requirements may be, for example, −3 dB lobe width, −10 dB lobe width, and/or pattern shape, etc. Last, a metamaterial adjusting element 140 is designed for the at least one frequency point such that the metamaterial adjusting element 140 shows reflection characteristics at the at least one frequency point.

In some examples, when the resonance structure formed on the radiator of the first radiating element 110 attenuates currents within a first portion of a frequency range of the second frequency band according to the design requirements, the metamaterial adjusting element 140 may be configured to at least reflect the second electromagnetic radiation incident on the metamaterial adjusting element 140 within a second portion of the frequency range of the second frequency band, wherein the superposition of the first portion of frequency range and the second portion of frequency range can cover the second frequency band. In other words, the metamaterial adjusting element 140 may be designed for the at least one frequency point such that the metamaterial adjusting element 140 is configured as a spatial band-stop filter, the stop band of which covers the at least one frequency point. Therefore, the combination of the cloaking function of the first radiating element 110 and the frequency selective characteristics of the metamaterial adjusting element 140 can reduce the interference from the first radiating element 110 over a wider frequency band, for example, the entire operating frequency band of the second radiating element 120, thereby improving the radiation pattern of the second antenna beam of the second radiating element 120 array.

Figure 6A:
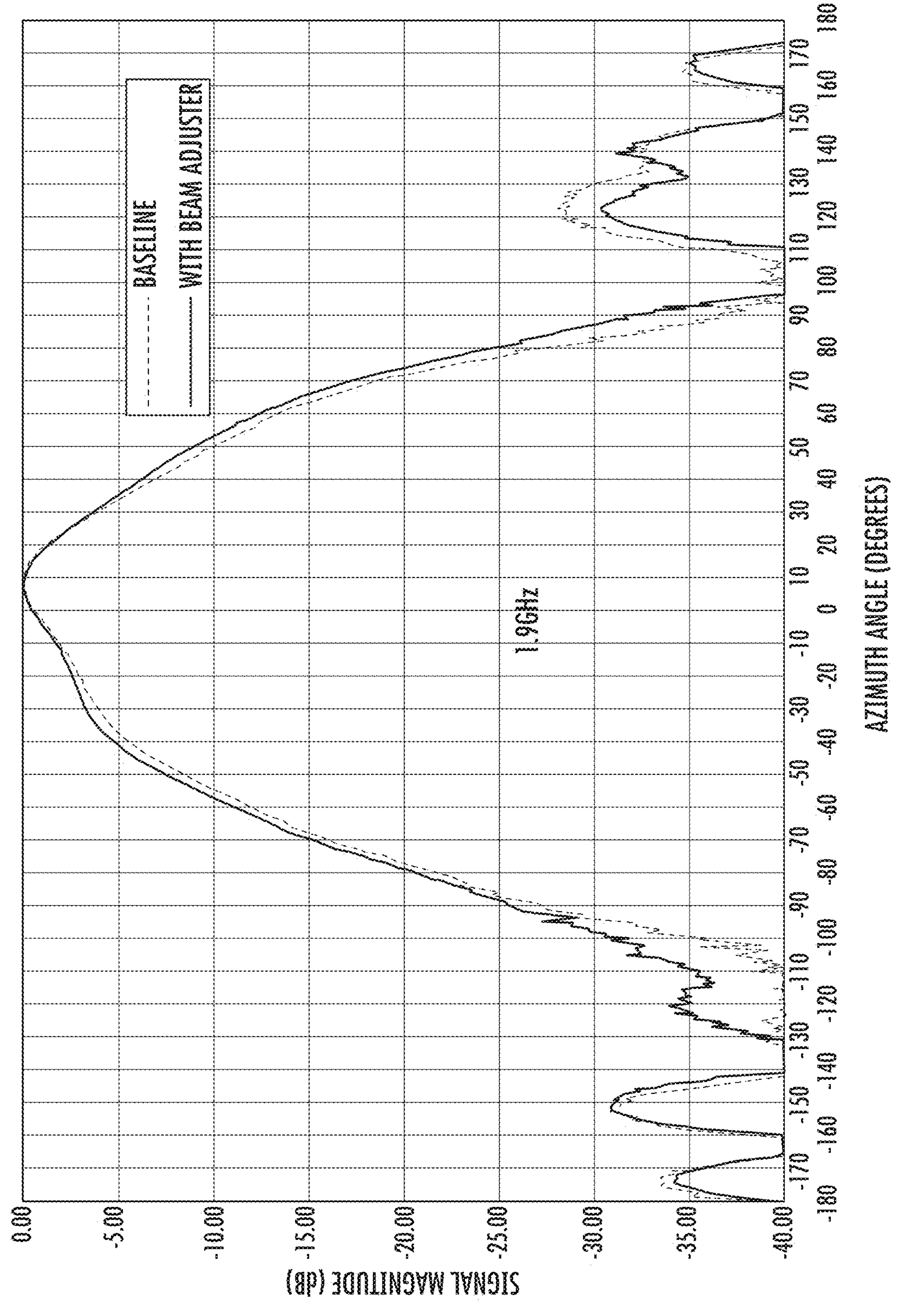
FIGS. 6*a* to 6*c* show comparison diagrams of patterns between a multi-band antenna with a metamaterial adjusting element and a multi-band antenna without a metamaterial adjusting element at several frequency points according to some examples of the present disclosure.
Figure 6B:
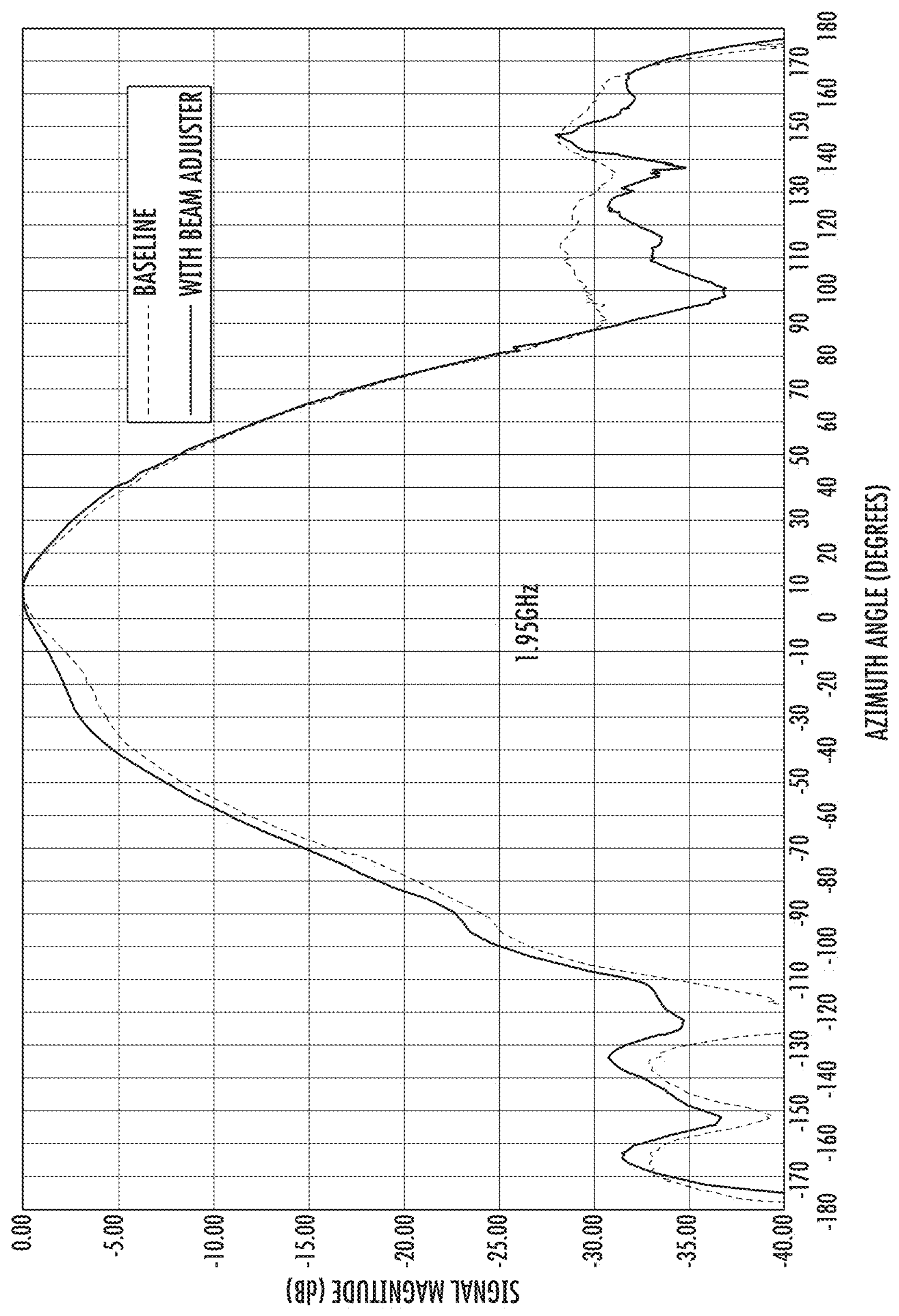
Figure 6C:
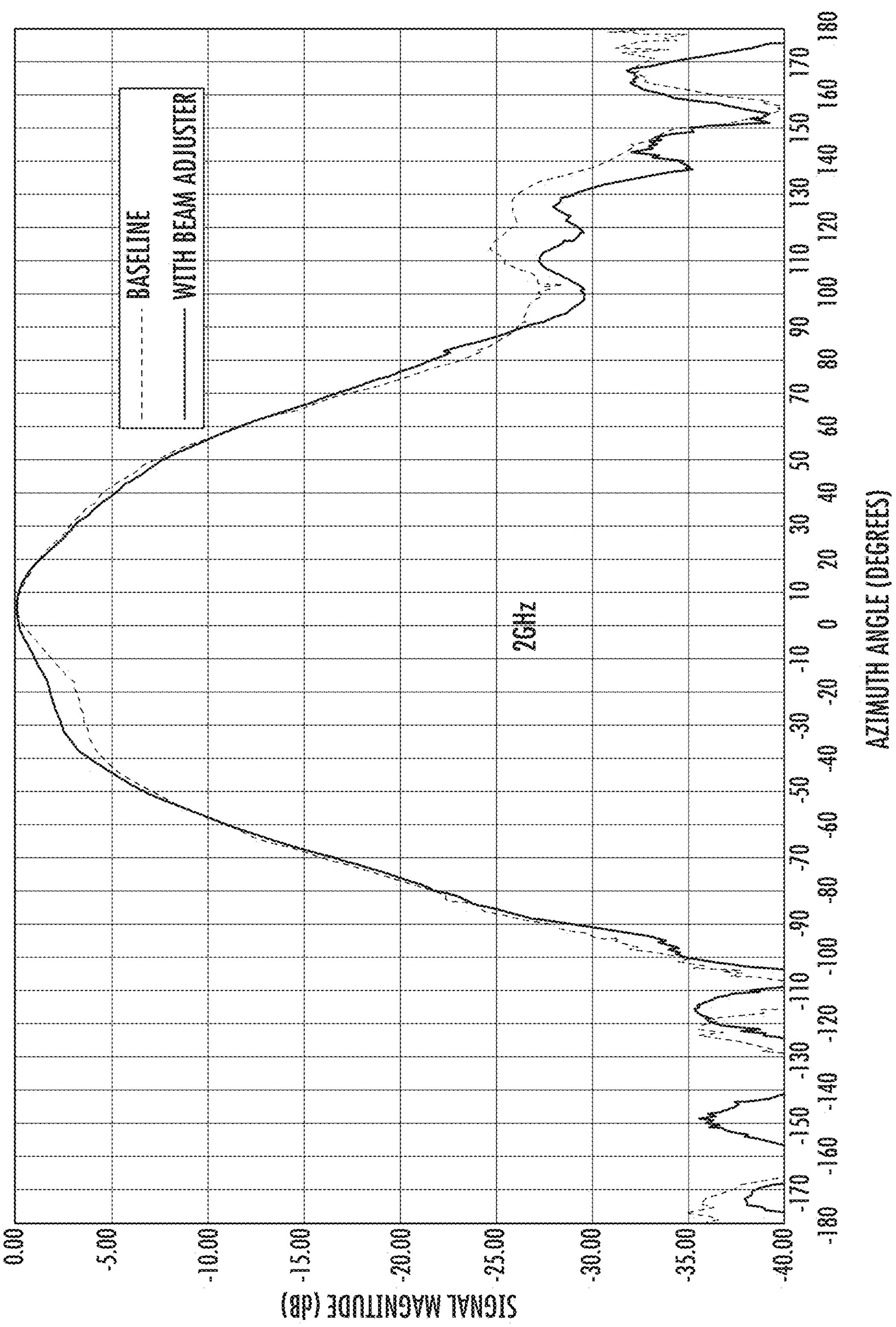

FIGS. 6*a* to 6*c* are azimuth patterns for a multi-band antenna with a metamaterial adjusting element and a multi-band antenna without a metamaterial adjusting element at 1.9 GHz, 1.95 GHz, and 2.0 GHz, respectively according to some examples of the present disclosure. As shown in the figures, the shape of the azimuth pattern of the multi-band antenna at the selected frequency points can be effectively improved by the metamaterial adjusting element.

Figure 7:
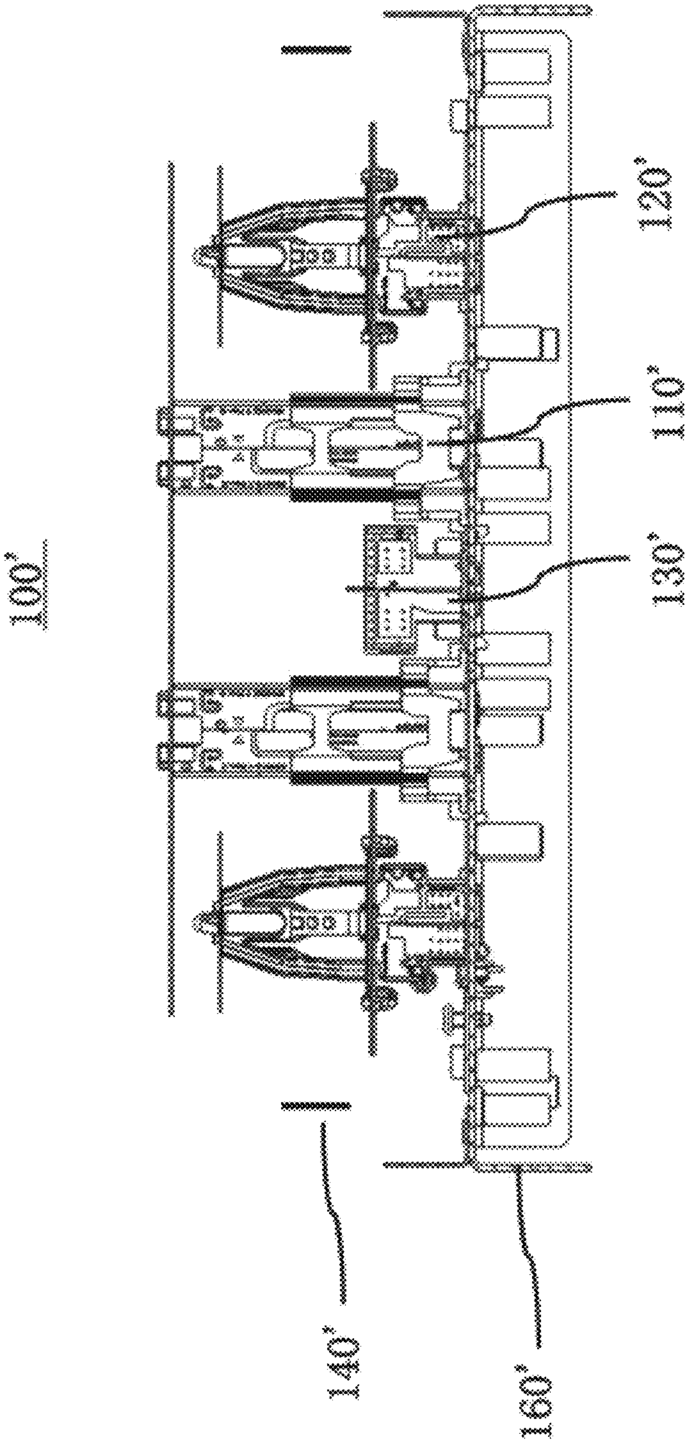
FIG. 7 is a schematic side view of a multi-band antenna according to some examples of the present disclosure.

Next, referring to FIG. 7, a schematic end view of the multi-band antenna 100 according to some examples of the present disclosure will be further introduced.

Another typical multi-band antenna 100' is shown in FIG. 7. The multi-band antenna 100' may include first radiating elements 110', second radiating elements 120', and third radiating elements 130' that are arranged on a front side of a reflector 160'. In the illustrated example, the second radiating elements 120' are arranged as two vertically extending linear arrays that are adjacent to each other in a horizontal direction. Depending on how these radiating elements 110' are fed, the two linear arrays of second radiating elements 120' may be configured to form two separate antenna beams, or may be configured to form a single antenna beam. The third radiating elements 130' may be arranged as a linear array that is disposed between the two linear arrays of second radiating elements 120'. The first radiating elements 110' are arranged staggered on both sides of a vertical central axis of the linear array of third radiating elements 130' slightly deviated from the axis, so as to obtain an antenna beam with a narrower beam width in the azimuth plane.

An operating frequency band of the first radiating elements 110' may be, for example, 617 to 960 MHz or a sub-band thereof. An operating frequency band of the second radiating elements 120' may be, for example, 1427 to 2690 MHz or a sub-band thereof. An operating frequency band of the third radiating elements 130' may be, for example, 3.1 to 4.2 GHz or a sub-band thereof. In other words, the first radiating elements 110' may be configured as low-band radiating elements that can operate within a first frequency band, for example 617 to 960 MHz or a sub-band thereof, and emit first electromagnetic radiation within the first frequency band. The second radiating elements 120' may be configured as mid-band radiating elements that can operate within a second frequency band, for example 1427 to 2690 MHz or a sub-band thereof, and emit second electromagnetic radiation within the second frequency band. The third radiating elements 130' may be configured as high-band radiating elements that can operate within a third frequency band, for example 3.1 to 4.2 GHz or a sub-band thereof, and emit third electromagnetic radiation within the third frequency band. For this type of multi-band antenna 100', a metamaterial adjusting element 140' may be designed as a spatial band-stop filter with frequency selective characteristics, and the stop band of the spatial band-stop filter covers the frequency band 1427 to 2690 MHz or a sub-band thereof such that the electromagnetic radiation within the first frequency band and the third frequency band can be transmitted through the metamaterial adjusting element 140' and the electromagnetic radiation within the second frequency band or a sub-band thereof is at least partially reflected by the metamaterial adjusting element 140'.

It should be understood that radiating elements with any operating frequency band may be introduced in the multi-band antennas 100 and 100', and the number and arrangement of the radiating element arrays in each frequency band may also vary. By introducing the metamaterial adjusting elements 140 and 140' into the multi-band antennas 100 and

100' and cooperating with radiating elements in certain frequency bands, the radiation patterns of the antenna beams of the multi-band antennas 100 and 100' can be effective adjusted.

Although some specific examples of the present disclosure have been described in detail by examples, those skilled in the art should understand that the above examples are only for illustration, not for limiting the scope of the present disclosure. The examples disclosed herein can be combined arbitrarily without departing from the spirit and scope of the present disclosure. Those skilled in the art should also understand that various modifications can be made to the examples without departing from the scope and spirit of the present disclosure. The scope of the present disclosure is defined by the Claims attached.

That which is claimed is:

1. A multi-band antenna, including:

a reflector;

a first radiating element, configured to operate within a first frequency band and configured to emit first electromagnetic radiation within the first frequency band;

a second radiating element, configured to operate within a second frequency band different from the first frequency band and configured to emit second electromagnetic radiation within the second frequency band; and a metamaterial adjusting element arranged forward of the reflector and behind the first radiating element, the metamaterial adjusting element configured to at least partially reflect the second electromagnetic radiation that is incident on the metamaterial adjusting element such that the reflected second electromagnetic radiation is redirected to at least partially cancel interference of the first radiating element to the second radiating element.

2. The multi-band antenna according to claim 1, wherein the metamaterial adjusting element is configured to be substantially invisible to the first electromagnetic radiation, so that the first electromagnetic radiation that is incident on the metamaterial adjusting element can be substantially transmitted through the metamaterial adjusting element.

3. The multi-band antenna according to claim 1, wherein the second electromagnetic radiation emitted by the second radiating element includes a portion that is incident on the first radiating element and is radiated backward by the first radiating element due to a scattering effect such that it is incident on the metamaterial adjusting element and is radiated forward by the metamaterial adjusting element.

4. The multi-band antenna according to claim 1, wherein the metamaterial adjusting element is configured as a frequency selective surface.

5. The multi-band antenna according to claim 1, wherein the multi-band antenna further includes a third radiating element, configured to emit third electromagnetic radiation within a third frequency band different from the first frequency band and the second frequency band.

6. The multi-band antenna according to claim 5, wherein the metamaterial adjusting element is configured to be substantially invisible to the third electromagnetic radiation, so that the third electromagnetic radiation that is incident on the metamaterial adjusting element is substantially transmitted through the metamaterial adjusting element.

7. The multi-band antenna according to claim 5, wherein the metamaterial adjusting element is configured to reflect the third electromagnetic radiation that is incident on the metamaterial adjusting element, so that the reflected third electromagnetic radiation is redirected.

8. The multi-band antenna according to claim 1, wherein the metamaterial adjusting element is configured as a spatial band-stop filter such that the first electromagnetic radiation within the first frequency band is transmitted through the metamaterial adjusting element, and the second electromagnetic radiation within the second frequency band is substantially reflected by the metamaterial adjusting element.

9. A multi-band antenna, including:

a first radiating element array, including a plurality of first radiating elements, the first radiating element array being configured to operate within a first frequency band and to generate a first antenna beam within the first frequency band;

a second radiating element array, including a plurality of second radiating elements, the second radiating element array being configured to operate within a second frequency band and to generate a second antenna beam within the second frequency band; and a metamaterial adjusting element array, including a plurality of metamaterial adjusting elements for the plurality of second radiating elements, wherein the plurality of metamaterial adjusting elements are arranged around the second radiating element array and at least partially behind the first radiating element array, and each metamaterial adjusting element is configured to have frequency selective characteristics, so that the metamaterial adjusting element array is configured to adjust a radiation pattern of the second antenna beam.

10. The multi-band antenna according to claim 9, wherein each metamaterial adjusting element is configured as a spatial band-stop filter such that electromagnetic radiation within the first frequency band can be transmitted through the metamaterial adjusting element, and electromagnetic radiation within the second frequency band is basically reflected by the metamaterial adjusting element.

11. The multi-band antenna according to claim 10, wherein each metamaterial adjusting element is configured to at least partially reflect second electromagnetic radiation within the second frequency band that is incident on the metamaterial adjusting element such that the reflected second electromagnetic radiation is redirected to at least partially cancel a scattering effect of the first radiating element array on the second electromagnetic radiation.

12. The multi-band antenna according to claim 11, wherein the second electromagnetic radiation emitted by one of the second radiating elements is incident on one of the first radiating elements and is radiated backward by the one of the first radiating elements due to the scattering effect such that it is incident on one of the plurality of metamaterial adjusting elements and is radiated forward by the one of metamaterial adjusting elements.

13. The multi-band antenna according to claim 10, wherein the metamaterial adjusting element is configured to be basically invisible to first electromagnetic radiation within the first frequency band.

14. The multi-band antenna according to claim 9, wherein each metamaterial adjusting element is configured as a frequency selective surface.

15. The multi-band antenna according to claim 14, wherein each frequency selective surface includes passive resonant units arranged periodically, so that the frequency selective surface exhibits total reflection characteristics at a resonant frequency of the passive resonance unit.

16. The multi-band antenna according to claim 9, wherein the plurality of metamaterial adjusting elements are arranged on an outer peripheral side of the first radiating element array and the second radiating element array.

17. A multi-band antenna, including:

a reflector;

a first radiating element that is configured to operate within a first frequency band;

a second radiating element that is configured to operate within a second frequency band different from the first frequency band; and a metamaterial adjusting element mounted to extend forwardly from a front surface of the reflector, the metamaterial adjusting element configured to substantially reflect electromagnetic radiation incident on the metamaterial adjusting element that is within a first portion of the second frequency band, wherein a major surface of the metamaterial adjusting element is mounted at an angle of between 65 degrees and 115 degrees with respect to the front surface of the reflector.

18. The multi-band antenna of claim 17, wherein the metamaterial adjusting element is configured to substantially pass electromagnetic radiation incident on the metamaterial adjusting element that is within the first frequency band.

19. The multi-band antenna of claim 17, wherein the metamaterial adjusting element is configured to substantially pass electromagnetic radiation incident on the metamaterial adjusting element that is within a second portion of the second frequency band.

* * * * *